United States Patent
Zhu et al.

(10) Patent No.: US 10,994,234 B2
(45) Date of Patent: May 4, 2021

(54) CERAMIC FOAM FILTER AND MANUFACTURING METHOD THEREOF

(71) Applicant: JINAN SHENGQUAN DOUBLESURPLUS CERAMIC FILTER CO., LTD, Shandong (CN)

(72) Inventors: Jianxun Zhu, Shandong (CN); Jinghao Liu, Shandong (CN); Shujin Yang, Shandong (CN)

(73) Assignee: Jinan Shengquan Doublesurplus Ceramic Filter Co., Ltd.

( * ) Notice: Subject to any disclaimer, the term of this patent is extended or adjusted under 35 U.S.C. 154(b) by 153 days.

(21) Appl. No.: 16/320,305

(22) PCT Filed: Jul. 24, 2017

(86) PCT No.: PCT/CN2017/094065
§ 371 (c)(1),
(2) Date: Jan. 24, 2019

(87) PCT Pub. No.: WO2018/019201
PCT Pub. Date: Feb. 1, 2018

(65) Prior Publication Data
US 2019/0270042 A1   Sep. 5, 2019

(30) Foreign Application Priority Data
Jul. 25, 2016   (CN) .......................... 201610590965.X

(51) Int. Cl.
*B01D 39/20*   (2006.01)
*C04B 35/488*   (2006.01)
*C22B 9/02*   (2006.01)
*C04B 35/565*   (2006.01)
*C04B 38/06*   (2006.01)
*C04B 35/48*   (2006.01)

(52) U.S. Cl.
CPC ......... *B01D 39/2093* (2013.01); *B01D 39/20* (2013.01); *C04B 35/48* (2013.01); *C04B 35/488* (2013.01); *C04B 35/565* (2013.01); *C04B 38/06* (2013.01); *C04B 38/0615* (2013.01); *C22B 9/023* (2013.01); *B01D 2239/10* (2013.01); *C04B 2235/3244* (2013.01); *C04B 2235/3418* (2013.01); *C04B 2235/3826* (2013.01); *C04B 2235/402* (2013.01); *C04B 2235/447* (2013.01); *C04B 2235/48* (2013.01); *C04B 2235/9676* (2013.01)

(58) Field of Classification Search
CPC .......................... B01D 39/2093; C22B 9/023
See application file for complete search history.

(56) References Cited

U.S. PATENT DOCUMENTS

| | | | |
|---|---|---|---|
| 4,885,263 A | 12/1989 | Brockmeyer et al. | |
| 5,279,737 A | 1/1994 | Sekhar et al. | |
| 5,456,833 A * | 10/1995 | Butcher ............. | B01D 39/2093 210/488 |

FOREIGN PATENT DOCUMENTS

| | | |
|---|---|---|
| CN | 101264401 | 9/2008 |
| CN | 101406781 | 4/2009 |
| CN | 102351566 | 2/2012 |
| CN | 103964862 | 8/2014 |
| CN | 106220218 | 12/2016 |
| JP | 61-251560 | 11/1986 |
| JP | S6487554 | 3/1989 |
| JP | 01183460 | 7/1989 |
| JP | 2013529167 | 7/2013 |
| WO | 02/18075 | 3/2002 |
| WO | 2007/028556 | 3/2007 |

OTHER PUBLICATIONS

Machine generated English language translation of CN 106220218 (Year: 2016).*

* cited by examiner

*Primary Examiner* — Scott R Kastler
(74) *Attorney, Agent, or Firm* — Barnes & Thornburg LLP; Jeffrey R. Stone

(57) ABSTRACT

A ceramic foam filter and a manufacturing method thereof. The ceramic foam filter comprises the following materials provided in respective weight percentages: 20-50% of a silicon carbide, 20-55% of a zirconium oxide, and 10-36% of a silicon oxide, wherein all figures are based on the total weight of the ceramic foam filter. The method for manufacturing the ceramic foam filter comprises the following steps: (a) providing a slurry comprising a silicon carbide, a zirconium oxide or zirconium oxide precursor, a silicon oxide or silicon oxide precursor, a binder, an optional additive, and a fluid carrier medium; (b) applying the slurry to perform surface ornamentation of a perforated organic foam; (c) drying the perforated organic foam surface ornamented with the slurry to obtain a green body; and (d) sintering the green body in oxygen-containing air to obtain the ceramic foam filter.

9 Claims, No Drawings

CERAMIC FOAM FILTER AND MANUFACTURING METHOD THEREOF

CROSS-REFERENCE TO RELATED APPLICATIONS

This application claims priority to Chinese Patent Application No. 201610590965.X, filed on Jul. 25, 2016 and entitled "Ceramic Foam Filter and Manufacturing Method Thereof", of which the contents are incorporated herein in its entirety by reference.

TECHNICAL FIELD

The present invention relates to the field of manufacturing high-temperature filters for foundry industry, and more particularly to a ceramic foam filter for filtering molten metal and a manufacturing method thereof.

BACKGROUND

The purification of metal liquids plays an important role in improving the mechanical properties of castings. At present, the filter device for purification of metal liquids is mainly a ceramic filter, which can effectively intercept harmful impurities in the metal liquids and make the metal liquids convert into a laminar flow from a turbulence flow, thoroughly remove large inclusions from the metal liquids as well as remove fine inclusions therefrom, improve the organizational structure, effectively reduce the gases and harmful elements in the metal liquids, and purify and homogenize the metal liquids.

Chinese Patent Application CN101164655A relates to a silicon carbide ceramic foam filter, in which a slurry is prepared from silicon carbide (60%-65%), aluminum oxide (30%-35%), silicon oxide (2%-5%), talc (0.5%-2.5%) and water, and carboxymethyl cellulose, polyvinyl alcohol and silica sol as binders, resulting in an oxide-bonded silicon carbide ceramic filter.

Chinese Patent Application CN1700948A discloses preparing an oxide-bonded silicon carbide ceramic filter with a ceramic slurry containing silicon carbide (40%-60%), a colloidal silicon dioxide binder (5%-20%) and at least 10% of fumed silica. The ceramic filter of CN1700948A was tested only at 1428° C.

Chinese Patent CN101708402B (Application NO. 200910227626.5) discloses preparing a multiphase silicon nitride-bonded silicon carbide filter. Although the silicon nitride-bonded silicon carbide filter has excellent performances such as high thermal stability and strong oxidation resistance, it can be infiltrated and eroded by molten liquids such as magnesium, nickel-chromium alloy and stainless steel.

Chinese Patent CN102173856A (Application No. 201010596190.X) discloses a filter, in which the mullite phase content is not less than 50 wt % and the chemical composition contains 40-80 wt % of $Al_2O_3$, 10-50 wt % of $SiO_2$ and 1-10 wt % of alkaline earth metal oxide. CN102173856A can only treat molten metal below 1550° C.

Chinese Patent CN102503520B (Application No. 201110371525.2) prepares a slurry comprising: 100 parts by weight of SiC, 5-8 parts by weight of silica powder, 10-13 parts by weight of aluminum oxide powder; 10-15 parts by weight of lithium bentonite, 5-20 parts by weight of a binder and 40-55 parts by weight of water, immerses an activated ceramic carrier in the slurry to sufficiently absorb the slurry; dump dries the ceramic carrier sufficiently absorbing the slurry to remove excess slurry so as to form a green body; and dries and sinters the green body to produce a SiC ceramic foam filter.

Chinese Patent CN100536987C provides a zirconium oxide ceramic foam filter, in which a ceramic powder composed of zirconium oxide (75%-80%), aluminum oxide (10-15%), calcium oxide (5%-10%), yttrium oxide (0.5%-2%) is prepared, then methyl cellulose, polyvinyl alcohol and water are added to the ceramic powder to prepare a slurry; flexible polyurethane foam is used as a carrier to impregnate the slurry, and extruded into a green body; after drying, a zirconium oxide ceramic foam filter is obtained by sintering at a high temperature of 1700-1800° C. Wherein, calcium oxide and yttrium oxide are added as a volume stabilizer to stabilize the crystal form. At 1500° C. or higher, the tetragonal zirconium oxide with the added calcium oxide and yttrium oxide form a cubic solid solution, which can be maintained after cooling with no reversible transformation of crystal forms and thus no volume effect, avoiding cracking during sintering.

At present, the filters for filtering metal liquids generally employ materials such as silicon carbide, aluminum oxide, zirconium oxide and carbon. The former two cannot meet the filtration of molten steel, while the latter two are more expensive. It is therefore necessary to develop a filter that is moderately priced and can filter molten steel.

In view of this, the present invention has been specifically proposed.

SUMMARY

The first object of the present invention is to provide a ceramic foam filter which has advantages of high temperature resistance, low costs and the like.

In one aspect, the present invention relates to a ceramic foam filter, which comprises the following materials provided in respective weight percentages:

20-50% of silicon carbide, 20-55% of zirconium oxide, and 10-36% of silicon oxide;

Preferably, 25-45% of silicon carbide, 25-50% of zirconium oxide, and 14-30% of silicon oxide;

more preferably, 30-40% of silicon carbide, 30-45% of zirconium oxide, and 15-25% of silicon oxide;

wherein all figures are based on the total weight of the ceramic foam filter.

Preferably, the ceramic foam filter has a porosity of 78%-90%, preferably 80%-85%, as measured according to the national standard GB/T25139-2010.

The sum of the weight percentages of silicon carbide, zirconium oxide and silicon oxide is 90% or more, or 95% or more, preferably 96% or more, more preferably 97% or more, further preferably 98% or more, and most preferably 99% or more, based on the total weight of the ceramic foam filter.

Preferably, the zirconium oxide or zirconium oxide precursor is one or more selected from the group consisting of stabilized zirconium oxide, zircon powder and zirconium silicate.

Preferably, the silicon oxide is fused silica or silicon micropowder.

Preferably, the binder is one or more selected from the group consisting of silica sol, aluminum sol, phosphate, sulfate, water glass, silicate, borate, carboxymethyl cellulose, methyl cellulose, hydroxyethyl cellulose, hydroxypropyl cellulose, hydroxypropylmethyl cellulose, cellulose ether, lignin, natural or synthetic resin, gum arabic, polyvinyl alcohol and polyvinyl butyral.

Preferably, the admixture is one or more selected from the group consisting of a dispersant, a wetting agent, a defoamer, a rheological agent and a surfactant.

The second object of the present invention is to provide a method for manufacturing the ceramic foam filter comprises the following steps:

(a) providing a slurry comprising silicon carbide, zirconium oxide or zirconium oxide precursor, silicon oxide or silicon oxide precursor, a binder, an optional admixture, and a liquid carrier;

(b) coating the slurry to a perforated organic foam;

(c) drying the perforated organic foam coated with the slurry to obtain a green body; and (d) sintering the green body in an oxygen-containing atmosphere to obtain the ceramic foam filter.

Preferably, the perforated organic foam is a polyurethane foam, a polyvinyl chloride foam, a polystyrene foam, a latex foam or a cellulose foam.

Preferably, the sintering temperature is 1000-1600° C., preferably 1100-1450° C.

The ceramic foam filter of the present invention has good high-temperature performance and can filter molten steel, as well as metal liquids such as iron, copper and aluminum without polluting the alloy, and has good through-hole rate so that good filtration and adsorption capacities for oxidation inclusions and flux inclusions in the metal solution are obtained. It has good filtration and purification effects and excellent strength at high temperature, thermal shock stability and chemical erosion resistance. At the same time, the present invention has a simple manufacturing process, and can prepare a filter product with a larger size.

DETAILED DESCRIPTION

The current silicon carbide filter is a system of silicon carbide, aluminum oxide, and silicon oxide. The present invention improves the high-temperature performance of the product by altering the material system.

The silicon carbide filter constituted by common general materials cannot filter molten steel. The object of the present invention is to provide a filter with better high-temperature performance and better thermal stability, which can withstand high temperature metal impact, and is used for filtering molten metals with high melting points, such as molten steel. Meanwhile, a manufacturing method of the above filter is provided, so that the filter has good sintering and comprehensive physical properties and also good thermal shock stability.

The present inventors have surprisingly found that the use of silicon carbide, zirconium oxide and silicon oxide can provide a filter having resistance to high-temperature metal impact and better thermal stability, which is used for filtering molten metals with high melting points, such as molten steel. The ceramic foam filter of the present invention is capable of achieving high temperature resistance when having a low zirconium oxide content (e.g. a zirconium oxide content of 20%-55%, preferably 25%-50%, e.g. 30%-45%, e.g. 35%-40%).

I. Ceramic Foam Filter

In one aspect, the present invention relates to a ceramic foam filter, in particular to a ceramic foam filter for filtering molten metals (such as molten steel), comprising: silicon carbide, zirconium oxide and silicon oxide.

Preferably, the ceramic foam filter of the present invention comprises:

silicon carbide: 20-50 parts by weight, preferably 25-45 parts by weight, more preferably 30-40 parts by weight, e.g. 35 parts by weight;

zirconium oxide: 20-55 parts by weight, preferably 25-50 parts by weight, more preferably 30-45 parts by weight, e.g. 35-40 parts by weight; and silicon oxide: 10-36 parts by weight, preferably 14-30 parts by weight, more preferably 15-25 parts by weight, e.g. 20 parts by weight.

Preferably, the ceramic foam filter of the present invention comprises the following materials provided in respective weight percentages:

silicon carbide: 20%-50%, preferably 25%-45%, more preferably 30%-40%, e.g. 35%;

zirconium oxide: 20%-55%, preferably 25%-50%, more preferably 30%-45%, e.g. 35%-40%; and;

silicon oxide: 10%-36%, preferably 14%-30%, more preferably 15%-25%, e.g. 20%;

wherein all figures are based on the total weight of the ceramic foam filter.

The content of silicon carbide by weight in the ceramic foam filter is: 20%-50%, preferably 25%-45%, more preferably 30%-40%, e.g. 35%;

the content of zirconium oxide by weight in the ceramic foam filter is: 20%-55%, preferably 25%-50%, more preferably 30%-45%, e.g. 35%-40%; and the content of silicon oxide by weight in the ceramic foam filter is: 10%-36%, preferably 14%-30%, more preferably 15%-25%, e.g. 20%.

In a preferred embodiment, the ceramic foam filter of the present invention comprises the following materials provided in respective weight percentages: 20-50% of silicon carbide, 20-55% of zirconium oxide, and 10-36% of silicon oxide, wherein all figures are based on the total weight of the ceramic foam filter.

In a preferred embodiment, the ceramic foam filter of the present invention comprises the following materials provided in respective weight percentages: 25-45% of silicon carbide, 30-45% of zirconium oxide, and 14-30% of silicon oxide, wherein all figures are based on the total weight of the ceramic foam filter.

In a preferred embodiment, the ceramic foam filter of the present invention comprises the following materials provided in respective weight percentages: 30-40% of silicon carbide, 30-45% of zirconium oxide, and 15-25% of silicon oxide, wherein all figures are based on the total weight of the ceramic foam filter.

The sum of the weight percentages of silicon carbide, zirconium oxide and silicon oxide is 90% or more, or 95% or more, preferably 96% or more, more preferably 97% or more, further preferably 98% or more, and most preferably 99% or more, based on the total weight of the ceramic foam filter.

In a preferred embodiment, the ceramic foam filter is composed of silicon carbide, zirconium oxide and silicon oxide.

Preferably, the ceramic foam filter of the present invention is resistant to a high temperature of 1600° C. or more, preferably to a high temperature of 1610° C. or more. In the present invention, the temperature in the high temperature resistance refers to a temperature at which a filter with a size of 50×50×15 mm filters at least 50 kg of molten steel without fracture.

Preferably, the ceramic foam filter of the present invention has a bulk density of 0.40-0.50 g/cm$^3$, e.g. 0.45 g/cm$^3$, as measured according to the national standard GB/T25139-2010.

Preferably, the ceramic foam filter of the present invention has a compressive strength at normal temperature of 1.5 MPa or more, preferably 1.6 MPa or more, more preferably 1.7 MPa or more, as measured according to the national standard GB/T25139-2010.

Preferably, the ceramic foam filter of the present invention has a compressive strength at high temperature (1200° C.) of 1 MPa or more, preferably 1.1 MPa or more, as measured according to the national standard GB/T25139-2010.

Preferably, the ceramic foam filter of the present invention has a thermal shock resistance (air cooling at 1200° C.-room temperature) greater than or equal to 3 times, preferably greater than or equal to 4 times, as measured according to the national standard GB/T25139-2010.

Preferably, the ceramic foam filter of the present invention has a porosity of 78%-90%, preferably 80%-85%, as measured according to the national standard GB/T25139-2010.

Preferably, the ceramic foam filter of the present invention is prepared from a slurry comprising the following materials:

silicon carbide, zirconium oxide or zirconium oxide precursor, silicon oxide or silicon oxide precursor, a binder, an optional admixture, an optional rheological agent (e.g. a thickener) and a liquid carrier.

II. Slurry and Components Thereof

The slurry comprises silicon carbide, zirconium oxide or zirconium oxide precursor, silicon oxide or silicon oxide precursor, a binder, an optional admixture, an optional rheological agent (e.g. a thickener) and a liquid carrier.

Preferably, the slurry comprises the following materials provided in respective weight percentages:

silicon carbide: 15-40%, preferably 20-35%, more preferably 25-30%;

zirconium oxide or zirconium oxide precursor: 15-50%, preferably 20-40%, more preferably 30-35%;

silicon oxide or silicon oxide precursor: 5-25%, preferably 8-20%, more preferably 10-17%;

the binder: 0.5-20%, preferably 1-15%, more preferably 5-10%;

the optional admixture: 0-10%, e.g. 0.001-10%, e.g. 0.01-8%, preferably 0.1-5%, more preferably 0.2-3%;

the liquid carrier: 5-30%, preferably 10-25%, more preferably 10-15%, further preferably the balance is the liquid carrier;

wherein all figures are based on the total weight of the slurry.

(1) Silicon Carbide

The silicon carbide may have a particle size of 100-400 mesh, preferably 200-325 mesh, more preferably 250-325 mesh. The particle size of silicon carbide is generally 200 mesh, and may further be 325 mesh so as to facilitate the molding of the product.

(2) Zirconium Oxide or Zirconium Oxide Precursor

The zirconium oxide precursor refers to a substance capable of being converted into zirconium oxide by heating in an oxygen-containing atmosphere (e.g. in a sintering condition).

Preferably, the zirconium oxide or zirconium oxide precursor is one or more selected from the group consisting of stabilized zirconium oxide, zircon powder and zirconium silicate. The zirconium oxide may be stabilized or unstable zirconium oxide, and the production method thereof is not limited, and it may be produced by electrofusion or chemical method. The zirconium oxide in the present invention can also be derived from zircon powder. Preferably, the zirconium oxide or zirconium oxide precursor has a particle size of 50-400 mesh, preferably 100-400 mesh, more preferably 200-325 mesh. The particle size of the zirconium oxide or zirconium oxide precursor is generally 325 mesh or even finer.

(3) Silicon Oxide or Silicon Oxide Precursor

The silicon oxide precursor refers to a substance capable of being converted into silicon oxide by heating in an oxygen-containing atmosphere (e.g. in a sintering condition).

Preferably, the silicon oxide is fused silica or silicon micropowder. The silicon oxide or silicon oxide precursor may have a particle size of 0.1-100 microns, preferably 5-80 microns, more preferably 10-60 microns, most preferably 5-44 microns. Preferably, the particle size of the silicon oxide is from 44 microns to several microns.

In order to ensure the strength of the sintered product and to lower the sintering temperature, the silicon oxide is derived from fused silica, zirconium-containing silicon micropowder collected in electrofusion of zirconium oxide, silicon micropowder collected from a ferroalloy plant and by-products produced during the melting of metal silicon. Microsilica powder produced by processing quartz may also be used, and added preferably in the form of nanomaterials.

The silicon oxide precursor may be silicate, such as zirconium silicate.

(4) Binder

The binder comprises an inorganic binder and an organic binder.

Preferably, the inorganic binder includes, but is not limited to, one or more selected from the group consisting of silica sol, aluminum sol, phosphate, sulfate, water glass, silicate (e.g. sodium silicate, potassium silicate) and borate.

Preferably, the silica sol has a silicon oxide content of 15%-40%, preferably 20%-30%, e.g. 25%-30% by weight.

Preferably, the aluminium sol has an aluminium oxide content of 10%-30%, preferably 12%-25%, more preferably 15%-20%, e.g. 15%.

Preferably, the organic binder is one or more selected from the group consisting of carboxymethyl cellulose, methyl cellulose, hydroxyethyl cellulose, hydroxypropyl cellulose, hydroxypropylmethyl cellulose, cellulose ether, lignin, natural or synthetic resin, gum arabic, polyvinyl alcohol and polyvinyl butyral. The natural or synthetic resin includes, but is not limited to, polyethylene oxide, polyacrylic compounds.

Preferably, the binder is one or more selected from the group consisting of the followings: silica sol, aluminum sol, phosphate, sulfate, water glass, silicate, borate, carboxymethyl cellulose, methyl cellulose, hydroxyethyl cellulose, hydroxypropyl cellulose, hydroxypropylmethyl cellulose, cellulose ether, lignin, natural or synthetic resin, gum arabic, polyvinyl alcohol and polyvinyl butyral.

Preferably, the binder is one or more selected from the group consisting of the followings: carboxymethyl cellulose, methyl cellulose, lignin, natural or synthetic resin, gum arabic, polyvinyl alcohol, polyvinyl butyral, silica sol, aluminum sol, phosphate, sulfate and water glass.

(5) Admixture

Preferably, the admixture includes, but is not limited to, a dispersant, a wetting agent, a defoamer, a rheological agent and a surfactant. For example, the admixture is one or more selected from the group consisting of a dispersant, a wetting agent, a defoamer, a rheological agent and a surfactant.

The dispersant includes sodium hexametaphosphate, sodium tripolyphosphate, polyacrylamide or sulfonic acids (such as sodium alkyl sulfonate, sodium methylene bisnaphthalenesulfonate). The dispersant is added in an amount of a few tenths of a percent by weight based on the total weight of the solids, e.g. 0.1%-8%, preferably 0.2%-1%, more preferably 0.3%-0.8%, so that the powder can be dispersed into the water during stirring.

The wetting agent can be, for example, SILCO WET of Silcona GmbH & CO. KG; GLYDOL N193 of Zschimmer & Schwarz, Germany.

The defoamer may be a mineral oil defoamer, a silicone defoamer, or a polyether defoamer. For example, the defoamer may be a silicone oil defoamer. The most commonly used silicone defoamer is polydimethylsiloxane, also known as dimethicone.

The rheological agent can be a thickener. In order to improve the molding property of the slurry, some thickeners such as xanthan gum, polyvinyl alcohol, bentonite (e.g. sodium-based or lithium-based bentonite), kaolin may be added.

(6) Liquid Carrier

The liquid carrier is typically water and may also be other liquids, e.g. organic solvents such as methanol, ethanol and isopropanol. An organic solvent is usually used for resin adhesive. Preferably, the liquid carrier is water or an organic solvent such as methanol, ethanol and isopropanol.

(7) Organic Foam

The organic foam is an open mesh material to ensure that the ceramic slurry can penetrate freely therethrough and adhere to each other followed by firing to form a porous skeleton.

When the liquid carrier is water, the organic foam is to be hydrophilic to be firmly adsorbed with the ceramic slurry.

The organic foam is typically a polymeric sponge prepared by a foaming process. The material of the organic foam may be polyurethane, polyvinyl chloride, polystyrene, latex or cellulose. Preferably, the organic foam is a polyurethane foam, preferably a flexible polyurethane foam sponge.

III. Method and Process Steps

The second object of the present invention is to provide a manufacturing method of the ceramic foam filter, comprising: preparing a slurry with silicon carbide, silicon oxide, zirconium-containing material, a binder, an admixture and a liquid carrier (e.g. water), and impregnating the slurry with a perforated organic foam (e.g. a flexible polyurethane foam sponge) as a carrier; after drying, sintering it, for example, at 1100-1450° C. in an oxygen-containing atmosphere (e.g. an air atmosphere) to obtain a ceramic foam filter for filtering metal liquids.

In another aspect, the present invention relates to a manufacturing method of the ceramic foam filter comprising the following steps:

(a) providing a slurry, e.g., formulating a slurry comprising silicon carbide, zirconium oxide or zirconium oxide precursor, silicon oxide or silicon oxide precursor, a binder, an optional admixture, and a liquid carrier;

(b) coating the slurry to a perforated organic foam;

(c) drying the perforated organic foam coated with the slurry to obtain a green body; and (d) sintering the green body to obtain the ceramic foam filter.

According to some preferred embodiments, the manufacturing method of the ceramic foam filter of the present invention comprises: providing silicon carbide: 20-35%; zirconium oxide: 20-40%; silicon oxide: 10-20%; a binder: 1-10%; an admixture: 0.1-5%; adding the above materials into water to high-speed mix and stir into a slurry with a certain viscosity, and coating the slurry to a polyurethane sponge, and sintering the sponge in an air atmosphere.

According to a preferred embodiment, a manufacturing method of the ceramic foam filter comprising the following steps is provided:

(a) providing a slurry, for example, formulating a slurry with raw materials and a liquid carrier (e.g. water);

(b) coating the formulated slurry to a cut polyurethane foam sponge by roll pressing to form at least one refractory coating;

(c) oven drying the perforated porous material with the formed refractory coating; and (d) sintering the sponge at 1100-1450° C.

The slurry, raw materials and formulation ratio in the method of the present invention are as described above, and are not described herein again.

The individual process steps are described in detail below.

(a) Providing a Slurry

For step (a), a slurry can be formulated. The solids and liquids in the slurry can be mixed using a high-efficiency mixer during the preparation of the slurry. The slurry comprises at least 70% of solids and no more than 30% of liquids, more preferably at least 75% of solids and no more than 25% of liquids; even at least 80% of solids and no more than 20% of liquids. For example, the slurry can be composed of 80% of solids and 20% of liquids.

(b) Coating Slurry

The organic foam (e.g., polyurethane foam) is cut into a block or other desired shape in a certain size. The organic foam can be pretreated prior to coating. For example, the organic foam is heated or hydrolyzed to remove blind film to ensure that the voids are unobstructed and thus increase the porosity. After the hydrolysis, it is repeatedly rubbed and washed with water, and air dried for future use.

Typically, the organic foam needs to be subjected to repeated extrusion to remove air prior to the slurry impregnation, followed by the slurry impregnation (coating). The slurry impregnation (coating) may be carried out by a normal-pressure adsorption method, a vacuum adsorption method, a mechanical rolling method or a manual rubbing method.

Preferably, the slurry impregnation (coating) is a roll pressing impregnation (coating). For example, the formulated slurry is coated to a cut polyurethane foam sponge by roll pressing to form at least one refractory coating.

The slurry impregnation can be carried out once, twice or more times. Preferably, the slurry impregnation is repeated a plurality of times until the internal air is completely removed. The impregnated organic foam is extruded to remove excess ceramic slurry to uniformly coat the slurry on the network structure of the foam, and the excess slurry is extruded further to form a green body.

(c) Drying

The coated porous green body needs to be dried. The drying can be carried out in a shade, by hot air, by infrared rays or by microwave.

Preferably, the coated material is dried at a higher temperature, such as 100-200° C. (e.g. about 150° C.), to remove all residual volatiles. Preferably, the moisture content after the drying is controlled to be within 1%, preferably within 0.5% by weight.

(d) Sintering

Preferably, the sintering temperature is 1000-1600° C., preferably 1050-1500° C., more preferably 1100-1450° C., e.g. 1300° C. The sintering is carried out in an oxygen-containing atmosphere, e.g. an air atmosphere. The sintering can generally be carried out in a kiln such as a shuttle kiln or a pusher kiln.

The filter may have a size of, e.g. 30-80×30-80×8-25 mm, preferably 40-60×40-60×10-20 mm, more preferably 45-55×45-55×12-18 mm, and most preferably 50×50×15 mm The ceramic foam filter of the present invention has good high-temperature performance in steel, iron, copper and aluminum solution, does not pollute the alloy, has good through-hole rate, and has good filtration and adsorption capacities for oxidation inclusions and flux inclusions in the metal solution. It has good filtration and purification effects, small heat fusion, and excellent strength at high temperature, thermal shock stability and chemical erosion resistance. At the same time, the present invention has a simple manufacturing process, and can prepare a product with a large size.

The embodiments of the present invention will be described in detail below with reference to the examples. However, those skilled in the art will understand that the following examples are merely illustrative of the present invention and are not intended to limit the scope of the present invention. Examples in which no specific conditions are specified are carried out according to conventional conditions or conditions recommended by the manufacturer. The reagents or instruments without the specified manufacturer are all conventional products that can be purchased in the market.

EXAMPLES

Raw Materials:
silicon carbide powder: 325 mesh;
zirconium oxide powder: 400 mesh;
zircon powder (65% of zirconium oxide; 33% of silicon oxide): 400 mesh;
silicon oxide powder: 1-3 microns;
aluminum sol: containing 15% of aluminum oxide;
silicon sol: containing 30% of silicon oxide;
zirconium silicate: 400 mesh;
aluminum phosphate solution: containing 7.5% of aluminum phosphate.

Example 1

Silicon carbide powder: 25%; zircon powder: 40%; silicon oxide: 10%; calcium lignosulfonate: 4%; aluminum phosphate solution (containing 7.5% of aluminum phosphate): 15%. The above materials are all commercial materials, and the proportions are all weight percentages. 0.1% of xanthan gum and 5.9% of water were required to be added to the above powder. A slurry was made by mixing the powder and water with a high-efficiency mixer. The slurry was used to coat to a polyurethane foam. After the slurry was coated to the foam, plugging holes were removed by air, and the foam was placed in a microwave drying oven, and held at 100-120° C. for 1 hour, and then cased in a sintering furnace to be sintered at 1450° C. Wherein the polyurethane foam is also a commercial material.

The filter prepared according to this formulation has a size of 50×50×15 mm and a porosity of 82%. 50 kg of molten steel was filtered at 1610° C., with the result that the filter withstood this test condition and the molten steel was filtered as required.

The chemical composition of the prepared filter was (calculated values): silicon carbide 33%; zirconium oxide 34%; silicon oxide 31%; others 2%.

Example 2

Silicon carbide powder: 20%; zirconium oxide powder: 40%; silicon oxide: 17%; aluminum sol: 10%. The above materials are all commercial materials, and the proportions are all weight percentages. 1% of bentonite and 12% of water were required to be added to the above powder. A slurry was made by mixing the powder and water with a high-efficiency mixer. The slurry was used to coat to a polyurethane foam. After the slurry was coated to the foam, plugging holes were removed by air, and the foam was placed in a hot air drying oven, and held at 100-120° C. for 2 hours, and then cased in a sintering furnace to be sintered at 1300° C. Wherein the polyurethane foam is also a commercial material.

The filter prepared according to this formulation has a size of 50×50×15 mm and a porosity of 83%. 50 kg of molten steel was filtered at 1610° C., with the result that the filter withstood this test condition and the molten steel was filtered as required.

The chemical composition of the prepared filter was (calculated values): silicon carbide 25.5%; zirconium oxide 51%; silicon oxide 21.5%; aluminum oxide 1%; others 1%.

Example 3

Silicon carbide powder: 35%; zirconium oxide powder: 30%; silicon oxide: 10%; silicon sol: 10%. The above materials are all commercial materials, and the proportions are all weight percentages. 15% of water was required to be added to the above powder. A slurry was made by mixing the powder and water with a high-efficiency mixer. The slurry was used to coat to a polyurethane foam. After the slurry was coated to the foam, plugging holes were removed by air, and the foam was placed in a hot air drying oven, and held at 100-120° C. for 1 hour, and then cased in a sintering furnace to be sintered at 1100° C. Wherein the polyurethane foam is also a commercial material.

The filter prepared according to this formulation has a size of 50×50×15 mm and a porosity of 84%. 50 kg of molten steel was filtered at 1610° C., with the result that the filter withstood this test condition and the molten steel was filtered as required.

The chemical composition of the prepared filter was (calculated values): silicon carbide 45%; zirconium oxide 38%; silicon oxide 17%.

Example 4

Silicon carbide powder: 40%; zirconium oxide powder: 34.9%; silicon oxide: 8%; silicon sol: 8%; xanthan gum 0.1%. The above materials are all commercial materials, and the proportions are all weight percentages. 9% of water was required to be added to the above powder. A slurry was made by mixing the powder and water with a high-efficiency mixer. The slurry was used to coat to a polyurethane foam. After the slurry was coated to the foam, plugging holes were removed by air, and the foam was placed in a hot air drying oven, and held at 100-120° C. for 2 hours, and then cased in a sintering furnace to be sintered at 1250° C. Wherein the polyurethane foam is also a commercial material.

The filter prepared according to this formulation has a size of 50×50×15 mm and a porosity of 83%. 50 kg of molten steel was filtered at 1610° C., with the result that the filter withstood this test condition and the molten steel was filtered as required.

The chemical composition of the prepared filter was (calculated values): silicon carbide 47%; zirconium oxide 27%; silicon oxide 26%.

Example 5

The preparation steps were the same as those in Example 1, and the specific formulation and conditions are shown in Table 1.

The filter prepared according to this formulation has a size of 50×50×15 mm and a porosity of 80%. 50 kg of molten steel was filtered at 1610° C., with the result that the filter withstood this test condition and the molten steel was filtered as required.

The chemical composition of the prepared filter was (calculated values): silicon carbide 46%; zirconium oxide 34%; silicon oxide 20%.

Example 6

The preparation steps were the same as those in Example 2, and the specific formulation and conditions are shown in Table 1.

The filter prepared according to this formulation has a size of 50×50×15 mm and a porosity of 85%. 50 kg of molten steel was filtered at 1610° C., with the result that the filter withstood this test condition and the molten steel was filtered as required.

The chemical composition of the prepared filter was (calculated values): silicon carbide 20%; zirconium oxide 42%; silicon oxide 36%; others 2%.

Example 7

The preparation steps were the same as those in Example 1, and the specific formulation and conditions are shown in Table 1.

The filter prepared according to this formulation has a size of 50×50×15 mm and a porosity of 84%. 50 kg of molten steel was filtered at 1610° C., with the result that the filter withstood this test condition and the molten steel was filtered as required.

The chemical composition of the prepared filter was (calculated values): silicon carbide 37%; zirconium oxide 49%; silicon oxide 14%.

Comparison Example 1

Silicon carbide powder: 36.5%; aluminum oxide powder: 31.2%; silicon oxide: 10.4%; silicon sol: 10.4%; polyvinyl alcohol: 4.2%. The above materials are all commercial materials, and the proportions are all weight percentages. 7.3% of water was required to be added to the above powder. A slurry was made by mixing the powder and water with a high-efficiency mixer. The slurry was used to coat to a polyurethane foam. After the slurry was coated to the foam, plugging holes were removed by air, and the foam was placed in a hot air drying oven, and held at 100-120° C. for 1 hour, and then cased in a sintering furnace to be sintered at 1100° C. Wherein the polyurethane foam is also a commercial material.

The filter prepared according to this formulation has a size of 50×50×15 mm, which can filter only 30 kg of molten steel at 1610° C., and it ruptured when the amount of the molten steel goes beyond 30 kg. Therefore the obtained filter cannot meet the operation requirements. The filter can filter only 50 kg of molten steel at 1550° C.

Comparison Example 2

Silicon carbide powder: 35.9%; chromite ore powder: 30.8%; silicon oxide: 10.3%; silicon sol: 10.3%; polyvinyl alcohol: 4.1%. The above materials are all commercial materials, and the proportions are all weight percentages. 8.7% of water based on the total weight of the slurry was required to be added to the above powder. The slurry was made by mixing the powder and water with a high-efficiency mixer. The slurry was used to coat to a polyurethane foam. After the slurry was coated to the foam, plugging holes were removed by air, and the foam was placed in a hot air drying oven, and held at 100-120° C. for 1-2 hours, and then cased in a sintering furnace to be sintered at 1100° C. Wherein the polyurethane foam is also a commercial material.

The filter prepared according to this formulation has a size 50×50×15 mm. It can filter 35 kg of molten steel at 1610° C., and it ruptured when the amount of the molten steel goes beyond 35 kg. Therefore the obtained filter cannot meet the operation requirements. The filter can filter only 50 kg of molten steel at 1570° C.

Comparison Example 3

Silicon carbide powder: 15%; mullite ($Al_2O_3$—$SiO_2$): 54%; silicon oxide: 8%; aluminum sol: 15%; clay 1.5%; bentonite 0.5%. The above materials are all commercial materials, and the proportions are all weight percentages. 6.0% of water was required to be added to the above powder. A slurry was made by mixing the powder and water with a high-efficiency mixer. The slurry was used to coat to a polyurethane foam. After the slurry was coated to the foam, plugging holes were removed by air, and the foam was placed in a hot air drying oven, and held at 100-120° C. for 2 hours, and then cased in a sintering furnace to be sintered at 1300° C. Wherein the polyurethane foam is also a commercial material.

The filter prepared according to this formulation has a size of 50×50×15 mm, which can filter only 20 kg of molten steel at 1610° C., and it ruptured when the amount of the molten steel goes beyond 20 kg. Therefore the obtained filter cannot meet the operation requirements. The filter can filter only 50 kg of molten steel at 1520° C.

Comparison Example 4

A ceramic foam filter was prepared according to Example 1 of CN102173856A, which contains 86.7% of mullite ($Al_2O_3$—$SiO_2$) and 7.0% of cristobalite and has a chemical composition of aluminum oxide 62.2 wt %, silica 31.5 wt %, calcium oxide 2.2 wt % and magnesium oxide 1.2 wt %.

The prepared filter has a size of 50×50×15 mm, which can filter only 20 kg of molten steel at 1610° C., and it ruptured when the amount of the molten steel goes beyond 20 kg. Therefore the obtained filter cannot meet the operation requirements. The filter can filter only 50 kg of molten steel at 1520° C.

Comparison Example 5

A ceramic foam filter was prepared according to Example 1 of CN100536987C, which has a chemical composition (theoretical values) of zirconium oxide 78.5%, aluminum oxide 13%, calcium oxide 6.5%, and yttrium oxide 1%.

The prepared filter has a size of 50×50×15 mm, which can filter only 40 kg of molten steel at 1610° C., and it ruptured when the amount of the molten steel goes beyond 40 kg. Therefore the obtained filter cannot meet the operation requirements. The filter can filter only 50 kg of molten steel at 1580° C.

Performance Testing (1) Bulk density: measured in accordance with the national standard GB/T25139-2010.

(2) Compressive strength at normal temperature: measured in accordance with the national standard GB/T25139-2010.

(3) Flexural strength at high temperature: measured in accordance with the national standard GB/T25139-2010.

(4) Thermal shock resistance: measured in accordance with the national standard GB/T25139-2010.

(5) Porosity: measured in accordance with the national standard GB/T25139-2010.

TABLE 1

|  | Example 1 | Example 2 | Example 3 | Example 4 | Example 5 | Example 6 | Example 7 |
|---|---|---|---|---|---|---|---|
| Silicon carbide powder | 25% | 20% | 35% | 40% | 40% | 15% | 30% |
| Zirconium oxide or precursor thereof | zircon powder: 40% | zirconium oxide powder: 40% | zirconium oxide powder: 30% | zircon powder: 34.9% | zirconium oxide powder: 30% | zirconium silicate: 45% | zirconium oxide powder: 40% |
| Silicon oxide | 10% | 17% | 10% | 8% | 15% | 10% | 10% |
| Binder | calcium lignosulfonate 4%, aluminum phosphate solution, 15% | aluminium sol: 10% | silica sol: 10% | silica sol: 8% | silica sol: 10% | calcium lignosulfonate 5%, aluminum phosphate solution, 10% | silica sol: 5% |
| Thickener | xanthan gum 0.1% | bentonite 1% | — | xanthan gum 0.1% | — | xanthan gum 0.1% | carboxymethyl cellulose 0.2% |
| Water | 5.9% | 12% | 15% | 9% | 5% | 14.9% | 14.8% |
| Sintering temperature | 1450° C. | 1300° C. | 1100° C. | 1250° C. | 1500° C. | 1400° C. | 1350° C. |
| high temperature resistance, | 1610° C. | 1610° C. | 1610° C. | 1610° C. | 1610° C. | 1610° C. | 1610° C. |
| Bulk density, g/cm³ | 0.46 | 0.455 | 0.47 | 0.46 | 0.47 | 0.46 | 0.46 |
| Compressive strength at normal temperature, MPa | 1.78 | 1.60 | 1.94 | 1.80 | 1.70 | 1.65 | 1.70 |
| Flexural strength at high temperature, MPa (1200° C.) | 1.04 | 1.12 | 1.20 | 1.09 | 1.1 | 1.08 | 1.1 |
| Thermal shock resistance (times), air cooling at 1200° C.-room temperature | 3 | 4 | 3 | 3 | 3 | 3 | 3 |

TABLE 2

|  | Comparison Example 1 | Comparison Example 2 | Comparison Example 3 | Comparison Example 4 | Comparison Example 5 |
|---|---|---|---|---|---|
|  | silicon carbide powder: 36.5% aluminum oxide powder: 31.2% silicon oxide 10.4% | silicon carbide powder: 35.9% chromium ore powder: 30.8% silicon oxide 10.3% | silicon carbide powder: 15% mullite 54% silicon oxide 10.3% | CaO 2.2% MgO 1.2% aluminum oxide 62.2% silicon oxide 31.5% | aluminum oxide 13% zirconium oxide 78.5% calcium oxide 6.5%; yttrium oxide 1% |
| Binder | silica sol: 10.4% | silica sol: 10.3% | aluminium sol: 15%; clay 1.5% | dextrin | hydroxymethyl cellulose, polyvinyl alcohol |
| Thickener | polyvinyl alcohol 4.2% | polyvinyl alcohol 4.1% | bentonite 0.5% | polyethylene glycol |  |
| Water | 7.3% | 8.7% | 6.0% |  |  |
| Sintering temperature | 1100° C. | 1100° C. | 1300° C. | 1600° C. | 1720° C. |
| high temperature resistance, | 1550° C. | 1570° C. | 1520° C. | 1520° C. | 1580° C. |
| Bulk density, g/cm³ | 0.46 | 0.47 | 0.47 | 0.5 | 0.5 |
| Compressive strength at normal temperature, MPa | 1.38 | 1.29 | 1.19 | 1.2 | 1.5 |

TABLE 2-continued

|  | Comparison Example 1 | Comparison Example 2 | Comparison Example 3 | Comparison Example 4 | Comparison Example 5 |
|---|---|---|---|---|---|
| Flexural strength at high temperature, MPa (1200° C.) | 0.73 | 0.90 | 0.80 | 0.7 | 1.0 |
| Thermal shock resistance (times), air cooling at 1200° C.-room temperature | 2 | 1 | 1 | 2 | 2 |

TABLE 3

| Items | Common filter | Filter of the present invention |
|---|---|---|
| Maximum operating temperature, ° C. | 1500 | 1610 |
| Bulk density, g/cm$^3$ | 0.40-0.50 | 0.40-0.50 |
| Compressive strength at normal temperature, MPa | ≥1.2 | ≥1.5 |
| Flexural strength at high temperature, MPa (1200° C.) | ≥0.8 | ≥1.0 |
| Thermal shock resistance (times), air cooling at 1200° C.-room temperature | 2-4 | 2-4 |

As can be seen from the data in Tables 1 and 2, the filters of Examples 1-7 of the present invention using zirconium oxide have better compressive strength, flexural strength at high temperature and thermal shock resistance than those of Comparison Example 1 using aluminum oxide, Comparison Example 2 using chromium ore powder and Comparison Examples 3 and 4 using mullite.

As shown in the data in Tables 1 and 2, Examples 1-7 of the present invention using materials of silicon carbide, zirconium oxide and silicon oxide can provide filters having resistance to high-temperature metal and better thermal stability and used for filtering molten metals with high melting points, such as molten steel. The ceramic foam filter of the present invention can realize high-temperature resistance under the condition of a low content of zirconium oxide (e.g. Examples 1-7), as well as good thermal stability, compressive strength at normal temperature, flexural strength at high temperature and thermal shock resistance.

As compared to Examples 1-7 of the present invention using silicon carbide, zirconium oxide and silicon oxide, Comparison Example 1 using silicon carbide, aluminum oxide and silicon oxide, Comparison Example 2 using silicon carbide, chromium ore powder and silicon oxide, Comparison Example 3 using silicon carbide, mullite ($Al_2O_3$—$SiO_2$) and silicon oxide, Comparison Example 4 using aluminum oxide and silicon oxide as main components, and Comparison Example 5 using zirconium oxide (78.5%) and aluminum oxide (13%), calcium oxide and yttrium oxide have poor high-temperature resistance, compressive strength at normal temperature, flexural strength at high temperature and thermal shock resistance.

Although it is disclosed herein that several samples are prepared from typical raw materials by a typical preparation mode and the desired effects are achieved, those skilled in the art can expect that the products of the present invention may be prepared with other raw materials, even resulting in superior effects, which are all included in the scope defined by the claims.

The present invention has been illustrated and described with reference to the embodiments, however, it should be appreciated that many other variations and modifications can be made without departing from the spirit and scope of the present invention. Accordingly, all such variations and modifications that fall within the scope of the invention are intended to be embraced in the appended claims.

What is claimed is:

1. A ceramic foam filter, wherein the ceramic foam filter comprises the following materials provided in respective weight percentages:
    20-35% of silicon carbide, 30-40% of zirconium oxide, and 10-17% of silicon oxide, wherein all percentages are based on the total weight of the ceramic foam filter, and wherein the temperature for sintering the materials to form the ceramic foam filter is 1000-1350° C.

2. The ceramic foam filter according to claim 1, wherein the ceramic foam filter has a porosity of 78%-90% as measured according to the national standard GB/T25139-2010.

3. The ceramic foam filter according to claim 1, wherein the sum of the weight percentages of silicon carbide, zirconium oxide and silicon oxide is 90% or more based on the total weight of the ceramic foam filter.

4. The ceramic foam filter according to claim 1, wherein the ceramic foam filter is made by sintering a slurry comprising silicon carbide, zirconium oxide or zirconium oxide precursor, silicon oxide or silicon oxide precursor, a binder, and a liquid carrier.

5. The ceramic foam filter according to claim 4, wherein the zirconium oxide or zirconium oxide precursor is one or more selected from the group consisting of stabilized zirconium oxide, zircon powder and zirconium silicate; the silicon oxide is fused silica or silicon micropowder.

6. The ceramic foam filter according to claim 4, wherein the binder is one or more selected from the group consisting of silica sol, aluminum sol, phosphate, sulfate, water glass, silicate, borate, carboxymethyl cellulose, methyl cellulose, hydroxyethyl cellulose, hydroxypropyl cellulose, hydroxypropylmethyl cellulose, cellulose ether, lignin, natural or synthetic resin, gum arabic, polyvinyl alcohol and polyvinyl butyral.

7. The ceramic foam filter according to claim 4, wherein the admixture is one or more selected from the group consisting of a dispersant, a wetting agent, a defoamer, a rheological agent and a surfactant.

8. A method for manufacturing the ceramic foam filter according to claim 1, wherein the method comprises the following steps:
    (a) providing a slurry comprising silicon carbide of 20-35%, zirconium oxide or zirconium oxide precursor of 30-40%, silicon oxide or silicon oxide precursor of 10-17%, a binder, and a liquid carrier;

(b) coating the slurry to a perforated organic foam;
(c) drying the perforated organic foam coated with the slurry to obtain a green body; and
(d) sintering the green body in an oxygen-containing atmosphere to obtain the ceramic foam filter, wherein the sintering temperature is 1000-1350° C.

9. The method according to claim 8, wherein the perforated organic foam is a polyurethane foam, a polyvinyl chloride foam, a polystyrene foam, a latex foam or a cellulose foam.

* * * * *